United States Patent [19]

Gardner

[11] 4,342,717
[45] Aug. 3, 1982

[54] INJECTION MOULDING METHOD AND APPARATUS WITH MOULD RUNNER RESERVOIR AND SHOT EXTENSION

[75] Inventor: Victor T. Gardner, Sheffield, England

[73] Assignee: HPM Corporation, Mount Gilead, Ohio

[21] Appl. No.: 179,952

[22] Filed: Aug. 21, 1980

Related U.S. Application Data

[60] Division of Ser. No. 922,448, Jul. 6, 1978, Pat. No. 4,256,689, which is a continuation of Ser. No. 725,327, Sep. 21, 1976, abandoned.

[30] Foreign Application Priority Data

Oct. 31, 1975 [GB] United Kingdom ............... 47237/74

[51] Int. Cl.³ ............................................. B29F 1/06
[52] U.S. Cl. ........................... 264/328.8; 264/328.13; 425/555
[58] Field of Search ............ 264/328.7, 328.8, 328.13; 425/555, 558

[56] References Cited

U.S. PATENT DOCUMENTS

| | | | |
|---|---|---|---|
| 3,611,505 | 10/1971 | Weber | 425/558 |
| 3,670,066 | 6/1972 | Valyi | 264/328.7 X |
| 3,709,644 | 1/1973 | Farrell | 425/160 |
| 3,847,525 | 11/1974 | Bielfeldt et al. | 425/560 X |

FOREIGN PATENT DOCUMENTS 6611365 2/1967 Netherlands.

Primary Examiner—Thomas P. Pavelko
Attorney, Agent, or Firm—Gust, Irish, Jeffers & Hoffman

[57] ABSTRACT

Method and apparatus for injection moulding of thermoplastic materials in which a screw in a plasticizer acts as an injection ram to inject plasticized material through a heated runner system into a mould. Part of the injected shot of plasticized material is passed into a reservoir communicating with the runner system. Upon completion of the injection of the shot, the passage from the plasticizer is closed by a valve and the screw is returned to plasticizing position while a pressure is applied to the plasticized material in the reservoir to force it into the runner system to apply a positive pressure so that an article is formed in the mold free of sink marks or weak spots. The reservoir may be provided in series with the shot injecting passage from the screw plasticizer by a nozzle on the plasticizer acting as a piston movable in a cylinder communicating with the runner system of the mould, the valve acting to close the plasticizer from the end of the mould. In an improved arrangement, the mould and cylinder may also constitute a reservoir receiving additional plasticized material from the mould before a succeeding shot of plasticized material is injected by ram action of the screw. In that case, the total amount of plasticized material for the succeeding operation is increased by the amount in the reservoir.

1 Claim, 12 Drawing Figures

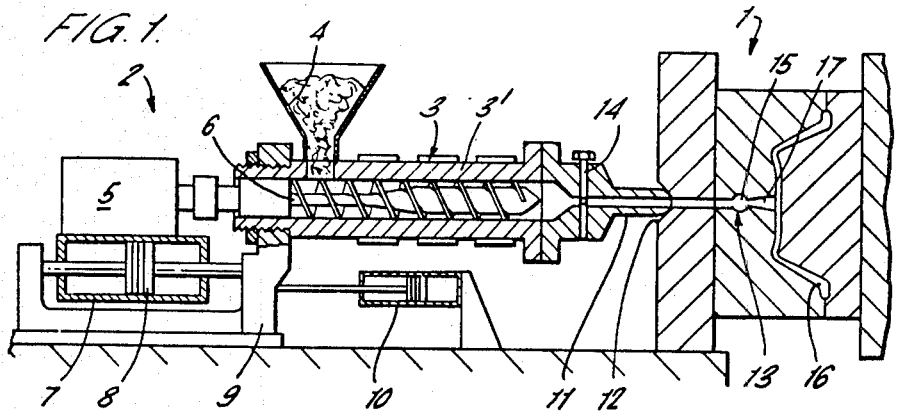
FIG. 1.
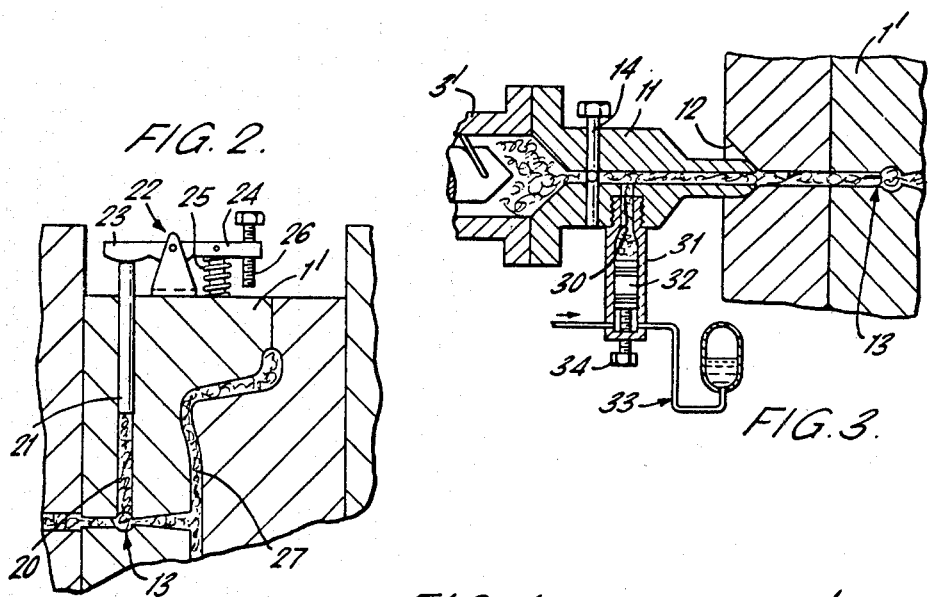
FIG. 2.
FIG. 3.
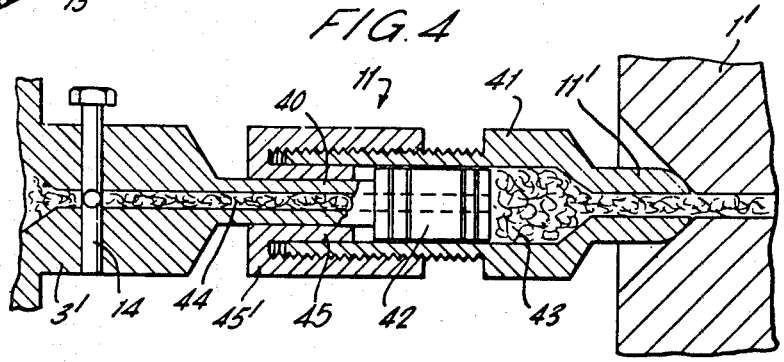
FIG. 4.

INJECTION MOULDING METHOD AND APPARATUS WITH MOULD RUNNER RESERVOIR AND SHOT EXTENSION

This is a division of application Ser. No. 922,448 filed July 6, 1978, now U.S. Pat. No. 4,256,689 issued Mar. 7, 1981 which is a continuation of application Ser. No. 725,327 filed Sept. 21, 1976, now abandoned.

BACKGROUND OF THE INVENTION

The invention is concerned with the injection moulding of thermoplastics materials, in which the plastics material is plasticized by a reciprocating screw plasticizer which then acts as an injection ram to inject the material through a heated runner system into a mould. In particular, the invention is concerned with the problems which arise when the components to be moulded are large in size.

With large moulds it is often necessary to maintain the pressure of injection for a considerable time after completion of the injection stroke due to both the longer time required for the molten thermoplastics material, or melt, to fill the cavities of the mould and the inevitable shrinkage which takes place during cooling. When the shape of the mould cavity is intricate, and as a result of the inevitable shrinkage, sink marks or weak spots often occur in the moulded component. By maintaining the injection pressure such defects can be minimized. However, if the screw injector is used to prolong the pressure, the injection cycle has to be lengthened because otherwise there may not be sufficient time for plasticization of the next shot. This, of course, results in an inefficient and thus more costly process.

In order to overcome this problem and in accordance with the present invention, in a method of injection moulding, after injection of a shot of fluent thermoplastics material by a screw injector through a runner system into a mould, a positive pressure is maintained on the runner system while the injection screw returns for plasticization of the succeeding shot of plastics material.

Preferably, after the injection stroke a valve is closed between the injection nozzle and the runner system to prevent the positive pressure applied to the runner system from also effecting the plasticizing unit.

By this method, a pressure slightly less than the standard injection pressure may be maintained in the runner system and hence in the mould cavity completely independently of the back-pressure requirements of the screw during the plasticizing process.

The invention also includes apparatus comprising an injection mould having a mould runner system and means for maintaining a positive pressure on the mould runner system.

In order to maintain the required pressure a small reservoir for the fluent plastics material may be connected to the runner system, the reservoir being partly or wholly filled during the injection stroke, and this small amount of material thereafter being forced back into the runner system under pressure. The reservoir may be provided, for example, by a cylinder in which a piston is arranged to slide, the piston being in connection on one side, with the runner system and being acted upon from the other side by a pressure source such as a coil spring or hydraulic or pneumatic pressure.

As an example, the invention may be carried out by means of an apparatus in which the injection nozzle is extended in the form of a cylindrical piston clamped to the end of the injection unit. Surrounding the piston is a nozzle sleeve which may be mounted on the mould itself. The sleeve has a cylindrical recess in which the piston slides and the recess has a frustoconical end cooperating with the end of the piston nozzle. The piston nozzle is slideable in the sleeve to allow the formation of a reservoir of plastics material on injection so that, by means of a pull-in cylinder, material may be injected into the mould after the injection shot in order to prevent sink marks or wheel spots occuring in the finished moulded article.

This apparatus can also be used in accordance with the invention to increase the capacity of each shot of thermoplastics material into the mould. Thus, it can provide a method of injection moulding in which a plasticized thermoplastics material is injected from a reciprocating screw plasticizing unit into a mould, and in which a positive pressure is maintained on the runner system while the injection screw returns for plasticization of the succeeding shot of plastics material, and, as a preliminary step, a reservoir positioned in series between the plasticizing unit and the mould is filled with plasticized thermoplastics material prior to the injection stroke and, on injection, the material in the reservoir is injected into the mould.

By prefilling the reservoir with plasticized thermoplastic material an additional volume of material equivalent to the volume of the reservoir can be injected into the mould. Thus, the volume of injected thermoplastics material, and hence the size of the moulding, can be increased without having to increase the size of the injection-plasticizing unit. Preferably, the reservoir is formed between the injection nozzle and the mould cavity.

Objects and advantages of the invention will become apparent to one skilled in the art to which the invention pertains from the following detailed description read in conjunction with the appended drawings.

THE DRAWINGS

FIG. 1 is a schematic and partly sectional side view of an injection moulding machine of a type using the invention;

FIG. 2 is a partial view in cross section of the mould portion used in one form of the invention;

Figure 5:
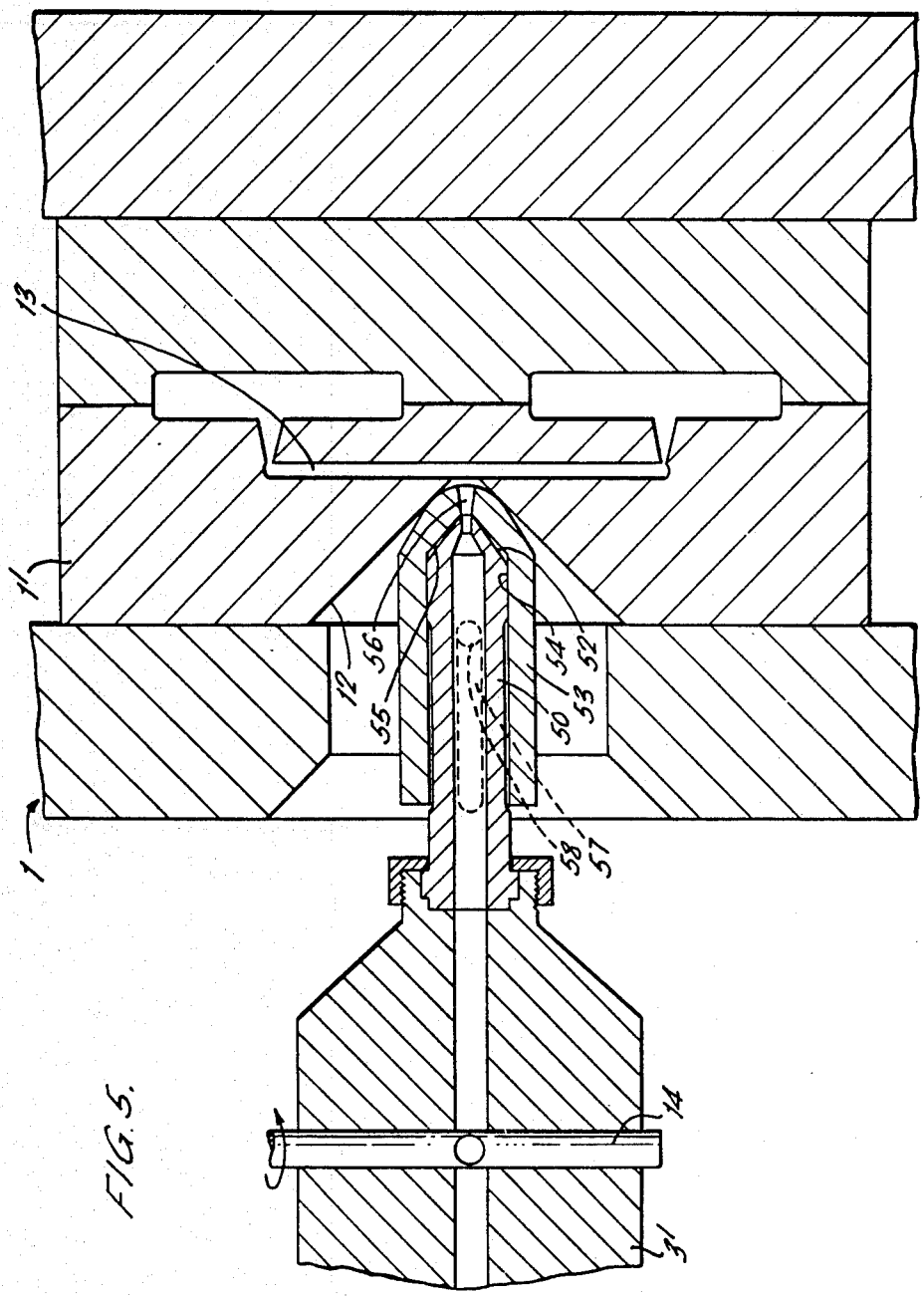

FIGS. 3, 4 and 5 are partial detailed cross sectional views of three modified forms of the invention of FIGS. 1 and 2; and FIGS. 6, 7, 8, 9, 10, 11 and 12 are partial cross-sectional views of another modification of the invention showing the position of the elements in different stages in the operation of molding an article therewith.

DETAILED DESCRIPTION OF THE INVENTION

In the machine of FIG. 1, the mould is indicated generally at 1 and the injection unit at 2. The injection unit 2 includes a screw plasticizing unit 3 for plasticizing the raw plastics material fed from a hopper 4. The unit 3 includes a motor 5 for rotating the screw 6 and also a hydraulic cylinder 7 and piston 8 which are used not only to push the screw forward, but also to maintain a controlled back pressure on the screw during plasticizing. The unit is in turn mounted on a structure 9 often referred to as the "cradle" and this cradle is capable of retraction away from the mould by means of a second hydraulic cylinder and piston arrangement 10. This arrangement, known as the pull-in cylinder, retains the injection nozzle 11 against the entry port 12 to the mould runner system 13. A shut-off valve 14 is included between the injection screw barrel 3 and the nozzle 11 in order to permit isolating the material injected into the mould 1 from that being plasticized by the screw 6.

In all the examples the flow channels 15 of the runner system 13 are maintained at the melt temperature of the material throughout the moulding cycle. Only the moulded article 16 and inevitable sprue 17 are cooled and ejected, leaving no solid material in the runner system. Since the pressure to be maintained in the runner system is incompatible with the plasticizing process, a separating shut-off valve 14 is provided.

In the first example, shown in FIG. 2, a small channel 20 is provided in the mould body in connection with the mould runner system 13, and in the channel a rod-like piston 21 is arranged to slide, thus closing the runner system from the atmosphere. A rocking tappet 22 has one end 23 which abuts the outer end of the piston 21 and its other end 24 bearing against a coiled spring 25 or hydraulic lead (not shown). The tappet 22 is also provided with an adjustable stop 26 to limit the movement of the piston 21. On injection of the plastics material the channel 20 is filled, pushing back the piston 21 against the biassing load of the spring 25. The displacement of the piston 21 is selected, by means of the adjustable stop 26, to be such that after injection and closing of the shut-off valve 14, (not shown in FIG. 2) all the plasticized material in the channel 20 is forced into the runner system 13 under load from the spring, thus preventing the formation of sinks or weak spots in the moulded product formed in the cavity 27.

The second example (shown in FIG. 3) is a short modification of the first wherein the channel 30 is short, is formed in the nozzle 11 itself, and leads into a cylinder 31 in which a piston 32 is arranged to travel. On injection, the piston 32 is forced backwards by the pressure of the fluent material and after closing of the valve 14 hydraulic or pneumatic pressure supplied to the rear of the piston by a circuit, illustrated diagrammatically at 33, forces the material into the runner system 13.

An adjustable stop 34 may be provided to limit displacement of the piston 32.

In the third example (FIG. 4) the injection nozzle 11 is more complicated and is divided into two parts 40 and 41, the end of the first part 40 opening through a piston 42 slidably arranged within a cylinder 43 formed in the second part 41 and which in turn communicates with the mould runner system 13 through the nozzle proper 11. The piston 42 has a diameter slightly larger than the external diameter of the duct 44 leading from the screw barrel 3' to the piston 42 and an annular sleeve 45 is provided behind the piston to prevent the piston moving right out of the cylinder 43. The sleeve is formed integrally with a second, internally screw-threaded, sleeve 45' which co-operates with a complimentary screw thread on the external face of the second part 41 to vary the displacement of the piston 42 on injection of the material.

On injection of the fluent material into the mould the plasticizing unit 3 is forced backward against the action of the pull-in cylinder 10 and is then moved forwards again under its action, after the shut-off valve 14 is automatically closed, thus forcing the material container in the cylinder 43 into the mould runner system 13.

In the fourth example (FIG. 5) similar to the third, the injection nozzle 11 is extended in the form of a cylindrical piston 50 clamped to the end of the unit 3 and having a frusto-conical surface 52 at its other end. Surrounding the piston 50 is a nozzle sleeve 53, which, as an alternative (not shown), may be mounted on the mould itself. The sleeve has a cylindrical recess 54 in which the piston 52 slides and the recess has a frusto-conical end 55 co-operating with the end of the piston nozzle and a spherical external surface 56 engaging entry port 12 of the mould runner system 13. As in the example of FIG. 4, the piston nozzle 50 is slidable in the sleeve 53 to allow the formation of a reservoir of the plastics material on injection, but limitation of the movement of the piston is achieved by a groove 57 in the side of the piston, a pin 58 sliding in the groove and being mounted on the sleeve. The pull-in cylinder 10 is again used to provide the pressure necessary to inject the extra material into the mould 1 after the injection of the shot of material into the mould cavity 16 which forces back the plasticizing unit 3. The pressure in the pull-in cylinder 10 may be momentarily released on injection to allow the return of the piston-nozzle 50 and plasticizing unit 3.

FIGS. 6 to 12 show apparatus similar to that of FIG. 5 which is used to provide a preliminary step in which a reservoir positioned in series between the plasticizing unit and the mould is provided with plasticized thermoplastics material prior to the injection of the shot of material in the plasticizer. On injection this material in the reservoir augments the total material available for each moulding operation.

Figure 6:
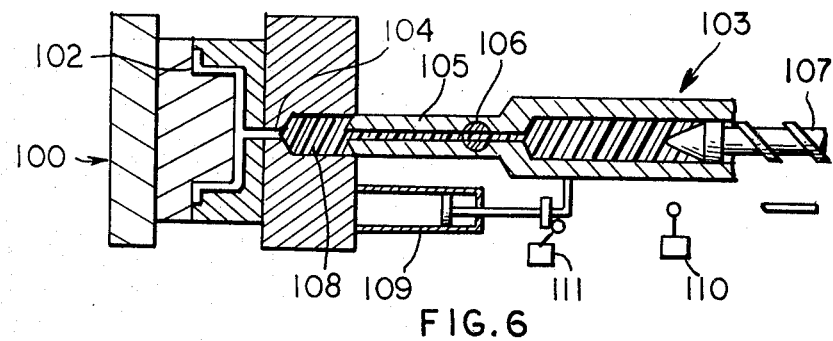

As shown in FIG. 6, the mould, indicated generally by the reference numeral 100, includes a mould cavity 102 which communicates with an injection plasticizing unit 103 through a mould runner system 104 and the nozzle 105 of an injection-plasticizing unit 103. The nozzle 105 includes a shut-off valve 106.

FIG. 6 further illustrates the apparatus at the start of injection from the injection-plasticizing unit 103 into the mould cavity 102. Prior to this, as will be described later, plasticized thermoplastics material prepared by a rotating screw extruder 107 has been passed to a reservoir 108. This reservoir 108 which may be of cylindrical shape is shown as formed in the mould or a bushing therein although it might be formed in an element similar to the sleeve 53 of FIG. 5. At the commencement of injection shut-off valve 106 is open to allow the flow of material from the injection-plasticizing unit 103 under the ram action of the screw 107 into the mould. Simultaneously, hydraulic pressure is also applied to a nozzle pull-in cylinder 109 in order to draw the nozzle 105 towards the mould. The nozzle pull-in cylinder 109 is mounted on the mould and the rod of the piston in connected to the nozzle.

Figure 7:
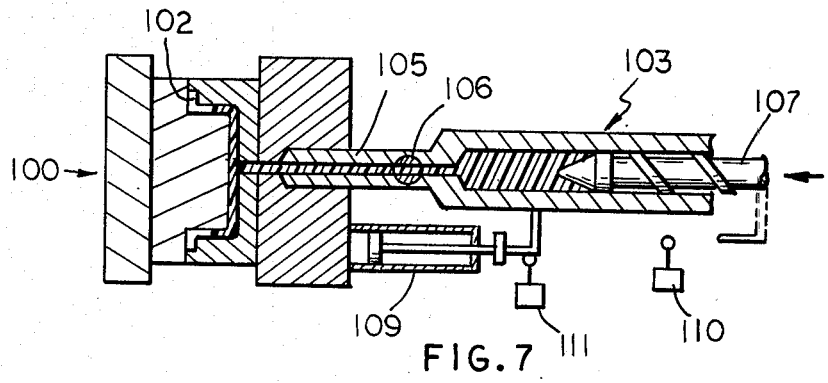
Figure 8:
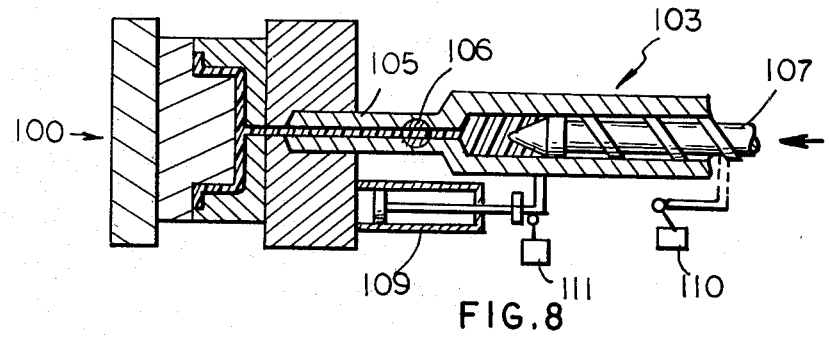
Figure 9:
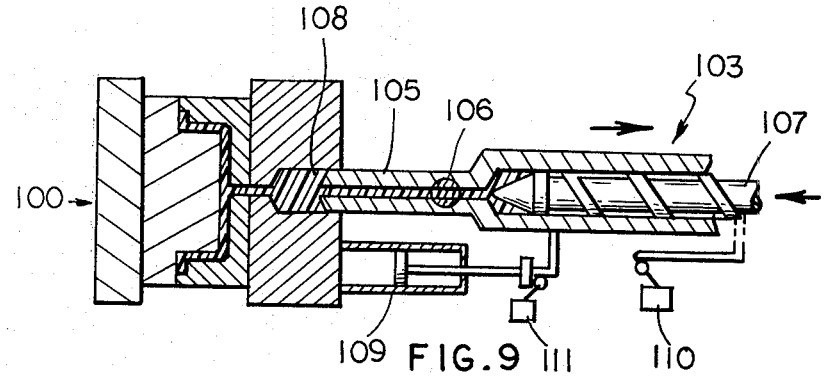

FIG. 7 illustrates the position in which the shot of plasticized thermoplastics material from the reservoir 108 has been injected into the mould cavity by the drawing-up of the nozzle into the mould, and simultaneously, further thermoplastics material is being injected by the forward movement of the screw or ram 107. During the final stages of the injection stroke (see FIG. 8) a microswitch 110 is actuated causing hydraulic fluid to be exhausted from the nozzle pull-in cylinder at a controlled rate of flow. This exhaustion of the hydraulic fluid from the nozzle pull-in cylinder (see FIG. 9) results in a controlled filling of the nozzle chamber with plasticized material from the chamber formed at the end of the plasticizing screw.

Figure 10:
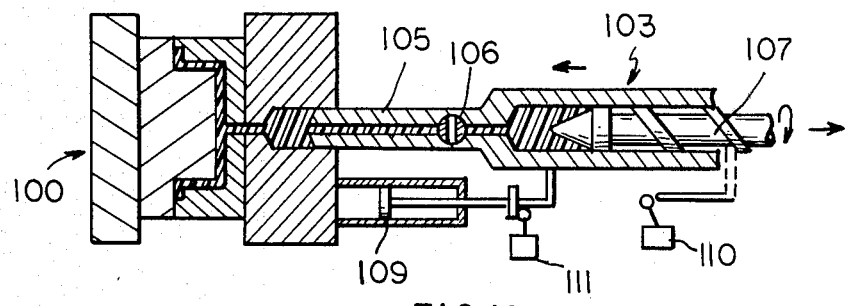
Figure 11:
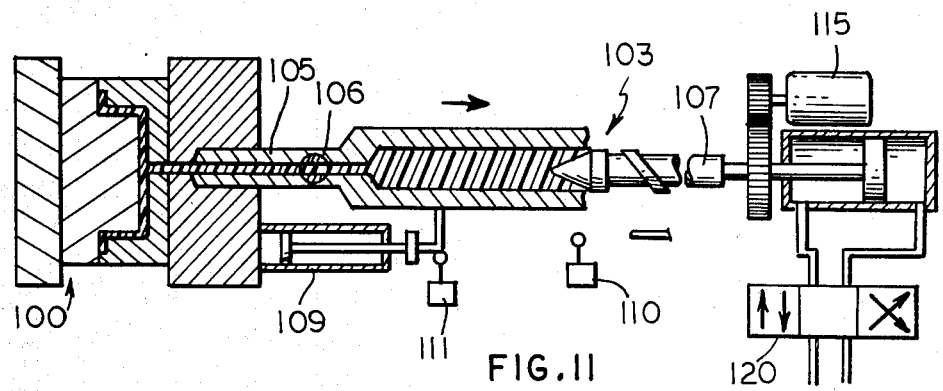
Figure 12:
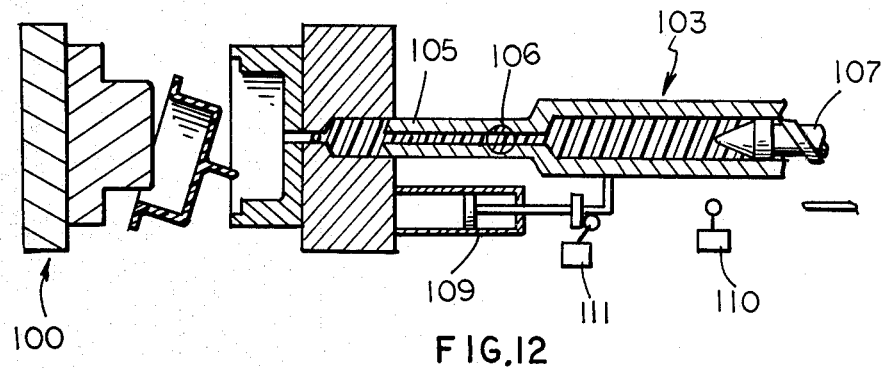

At the end of the injection stroke the nozzle shut off valve 106 closes to allow plasticization to commence. At the same time, a microswitch 111 is actuated which in turn actuates the nozzle pull-in cylinder 109 (see FIG. 10) to cause a preset injection low pressure hold on the pressure applied to the material in the mould cavity. This action is similar to that discussed in detail above in connection with the operation of the apparatus of FIGS. 1 to 5. With closure of valve 106, the screw 107 is drawn rearwardly as also shown in FIG. 10 by a hydraulic cylinder 117 (see FIG. 11) to the position shown in FIG. 11 for rotation by motor 115 to plasticize additional thermoplastics material.

The injection low pressure hold is operated with flow control equipment which insures that the nozzle chamber 108 is gradually emptied of material so that sink marks in the mouldings are eliminated. The low pressure hold remains until the screw has filled the barrel with plasticized thermoplastics material and at this stage the screw 107 continues rotating and the screw is prevented from moving forward by a valve 120 actuated to a centre-blanked position (see FIG. 11). The nozzle pull-in cylinder pressure is relaxed, and the valve 106 is opened, allowing the rotating screw 107 to feed material into the nozzle reservoir 108, packing the nozzle back and filling the reservoir 108 (see FIG. 12). This nozzle reservoir 108, now being full of plasticized material, provides this increased volume of material for injection into the mould upon the commencement of the next moulding operation (see FIG. 6). While this filling of the reservoir as just discussed continues, the screw 107 continues rotating to plasticize further material.

Once the nozzle reservoir is full and the screw stops rotating the mould opens and ejects the previous moulding, the mould closes (see FIG. 12) and the machine is then ready for commencement of the next cycle or moulding operation, the beginning of which is illustrated in FIG. 6.

The present embodiments of the invention as described herein are to be considered as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of injection molding an article comprising the steps of:

providing an injection mold having a runner system extending from an article forming cavity therein to a mold entry port, injecting a shot of plasticized thermoplastics material from an injector with a screw plasticizer into the mold through said port while advancing the screw in a chamber of the plasticizer, communicating said runner system with a reservoir at a location upstream of said article forming cavity for conducting plasticized thermoplastics material into said reservoir against the bias of compressible means so that said compressible means is compressed and stores energy as said screw is being advanced, and subsequently closing communication between the plasticizer chamber and said runner system while maintaining communication between said reservoir and said runner system so that the stored energy in said compressible means exerts a positive pressure on the plasticized material in the runner system and mold cavity thereby compensating for shrinkage while returning the screw for plasticization of plastics material for a succeeding shot.

* * * * *